Oct. 17, 1933.　　　　B. NAGY　　　　1,931,294
BOTTLE CLOSURE ASSEMBLING MACHINE
Filed May 26, 1931　　5 Sheets-Sheet 1

INVENTOR
*Berthold Nagy,*
BY *Julian J. Wittal,*
his ATTORNEY

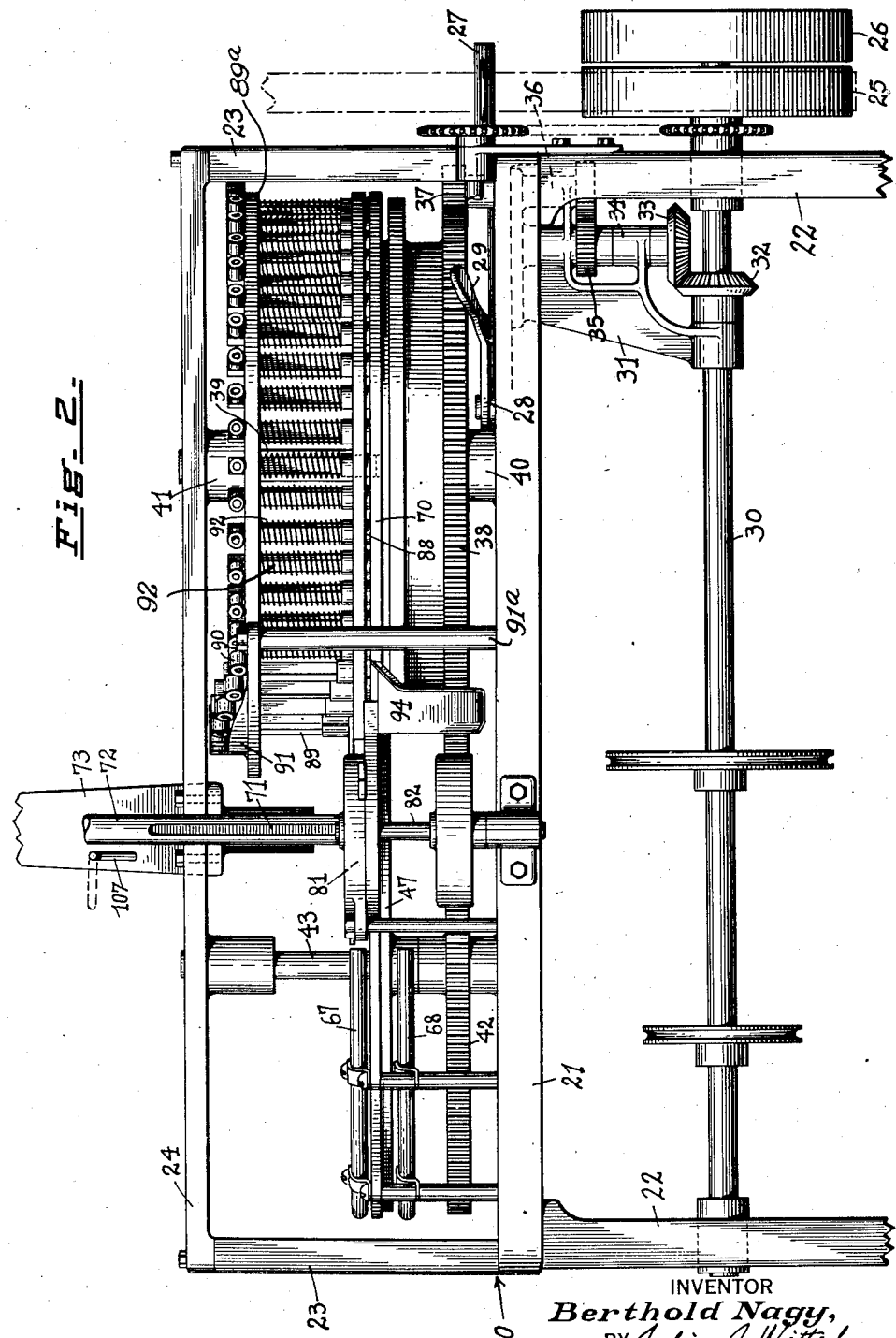

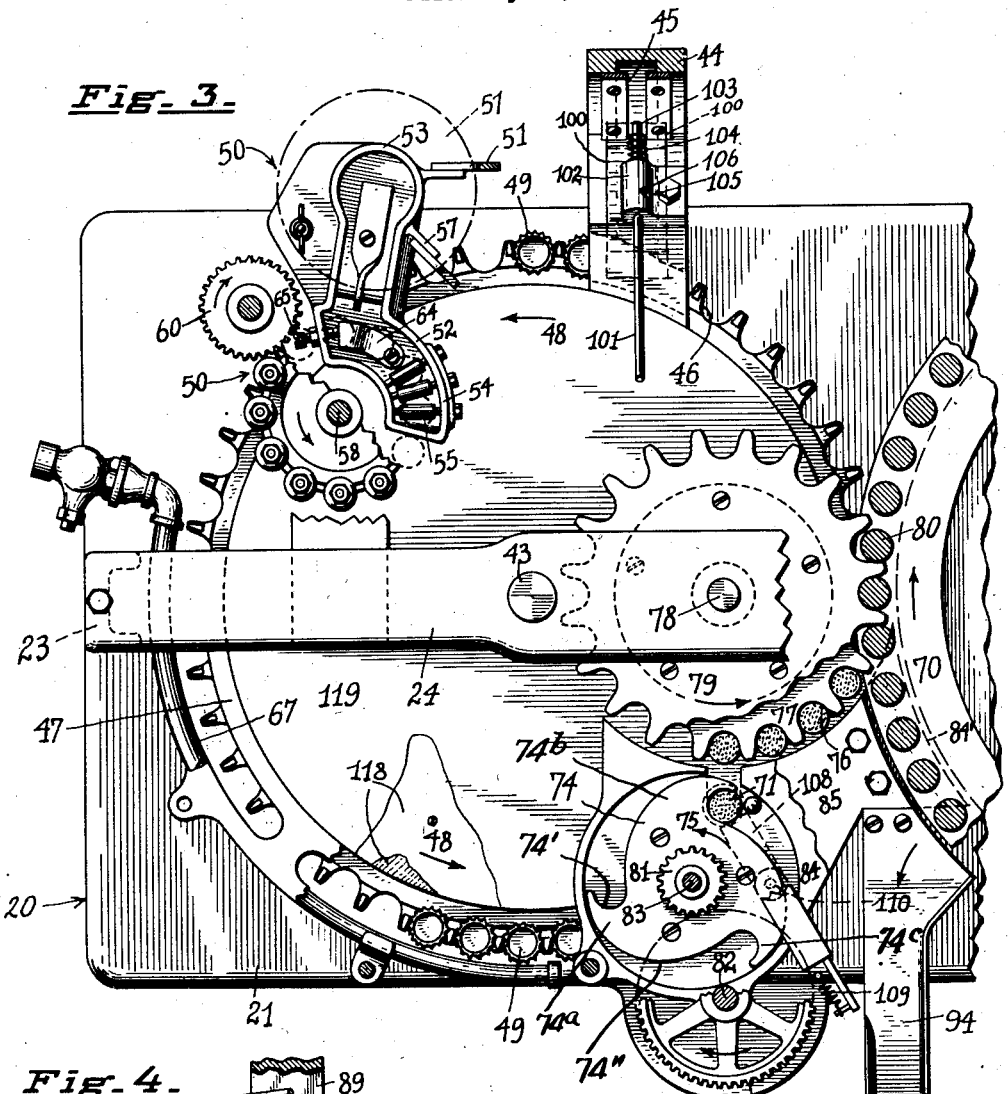

Oct. 17, 1933.  B. NAGY  1,931,294
BOTTLE CLOSURE ASSEMBLING MACHINE
Filed May 26, 1931  5 Sheets-Sheet 4
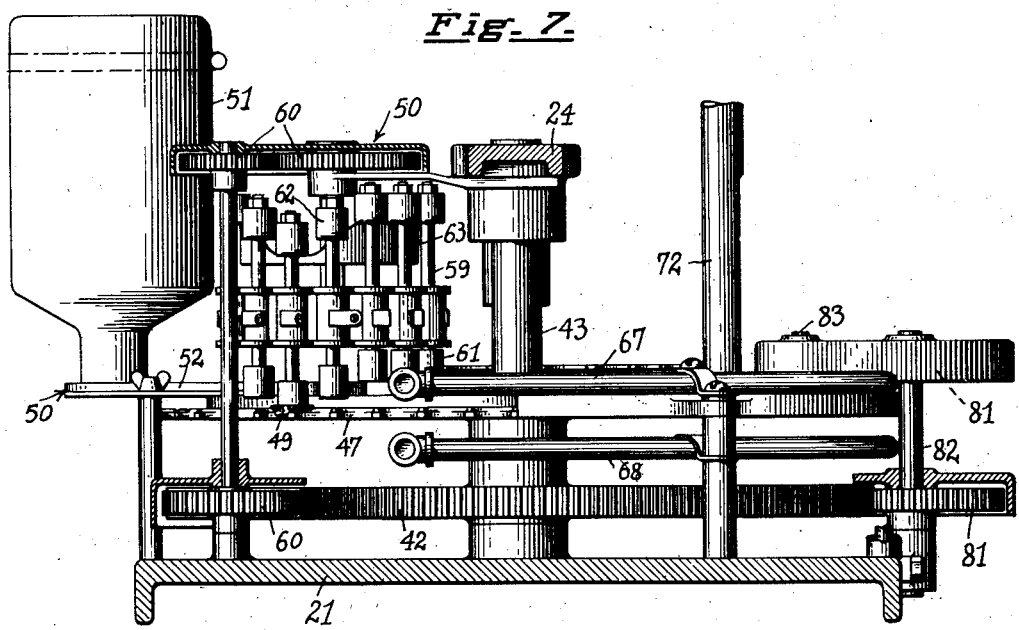
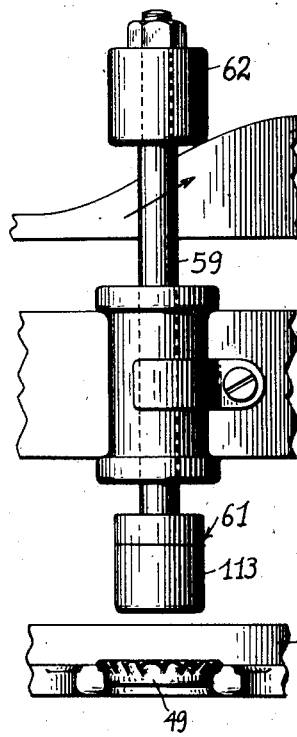
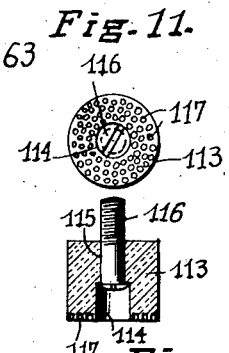
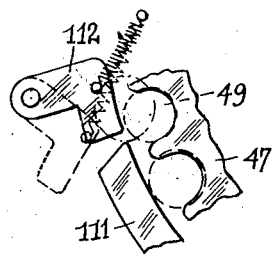
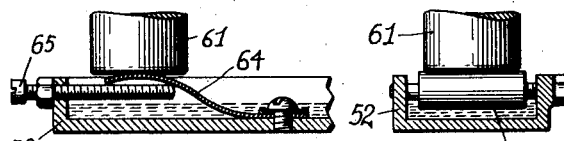
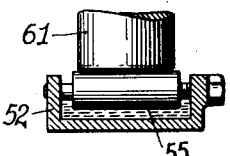
INVENTOR
*Berthold Nagy,*
BY *Julian J. Wittal,*
his ATTORNEY Oct. 17, 1933.  B. NAGY  1,931,294
BOTTLE CLOSURE ASSEMBLING MACHINE
Filed May 26, 1931  5 Sheets-Sheet 5

INVENTOR
Berthold Nagy,
BY
HIS ATTORNEY

Patented Oct. 17, 1933

1,931,294

UNITED STATES PATENT OFFICE 1,931,294

BOTTLE CLOSURE ASSEMBLING MACHINE

Berthold Nagy, Brooklyn, N. Y.

Application May 26, 1931. Serial No. 540,183

24 Claims. (Cl. 113—80)

My invention relates to improvements in machines for assembling the several parts of a bottle closure, or similar article, said parts consisting usually of a metallic cap, a sealing gasket or packing, and a cementing medium interposed between the cap and the gasket, and the object of my invention is to furnish an improved machine for accomplishing this end in an expeditious, economical and satisfactory manner.

Further objects of my invention will be apparent as the specification of the same proceeds.

In the drawings, forming part of this specification and being attached hereto:

Fig. 2 is a side elevation of my bottle closure assembling machine, some parts of the same being removed;

Fig. 3 is a plan view of the left hand part of the machine on an enlarged scale, portions of the same being broken away or in section;

Fig. 4 is a fragmentary enlarged detail showing a plunger used for pressing the sealing disk into the metal cap;

Figs. 5 and 6 are detail views of the metal cap and cork sealing disk, respectively;

Fig. 7 is a fragmentary end elevation, partly in section, of my machine; showing the glue applying device;

Fig. 8 is an enlarged detail view of a plunger used in said glue device;

Figs. 9 and 10 are fragmentary details showing appliances for removing the superfluous glue and for applying the glue to a plunger, respectively;

Fig. 11 shows an improved rubber tip to be used on my glue applying plungers;

Fig. 12 is a fragmentary diagrammatic detail showing a mechanism for removing faulty caps from my machine.

Figure 1:
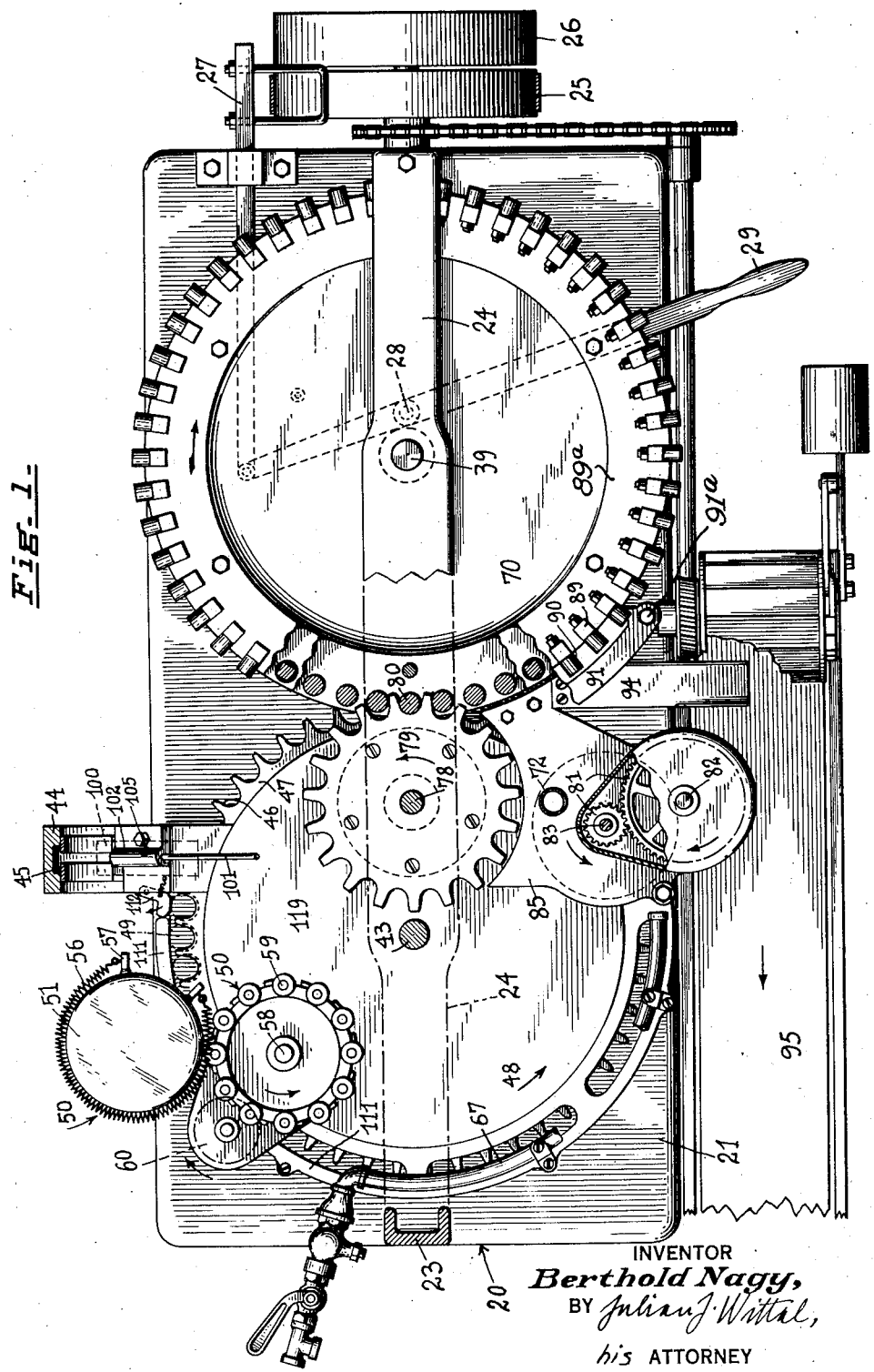
Fig. 1 is a plan view of my assembled device, portions of the same being in section.

Referring now more closely to the drawings, by characters of reference, the numeral 20 indicates the frame structure of my machine, in general, being composed of the table 21, legs 22, upstanding posts 23, at the centers of the two ends of the table, and reinforcing a shaft carrying bridge piece 24 connecting the upper ends of posts 23 and being secured thereto.

The driving power of the machine is attached to or disconnected from the same through fast and loose pulleys 25 and 26 controlled by the belt moving frame 27, the operating mechanism of which is pivoted on the table 21, as at 28 and is put in motion through the handle 29. Said pulleys sit on a main shaft 30 journalled in the legs 22 and in downhanging bracket 31. A bevel gear 32 is fast on shaft 30, being in driving engagement with bevel gear 33 on vertical shaft 34, the same driving, through gearing 35, a second vertical shaft 36, which through gear 37 is adapted to drive the large gear 38 secured on and rotatable with the large right hand vertical shaft 39 journalled at 40 in the table 21, and at 41, in bridge piece 24.

Said large gear 38 is in mesh with and adapted to drive the left hand large gear 42 secured on and rotatable with the large left hand shaft 43 journalled in a similar manner are the shaft 39. These two shafts have secured thereon and rotatable therewith the metal cap and assembled closure carrying wheels, respectively, as will be described presently.

The metal caps 49, illustrated in Fig. 5, and well known in the art, are arranged in a hopper or feeding device, of any appropriate design, (not shown), many of which are well known in this art, and secured on a bracket 44 which provides a guide channel 45 in which said caps may, in the right position and in a single row slide downwardly and into the pockets or recesses 46 of a wheel 47 rotating with shaft 43 in the direction of arrow 48.

Caps 49 in said wheel are now carried underneath and through the glue applying devices, generally indicated by the numeral 50. The first element of said devices is an inverted container 51, usually a glass bottle, open at the bottom and containing a desired amount of liquid cementing material or glue. A glue channel casting 52 is secured to the frame work of the machine and the open bottom end of the container 51 is set into the outer circular portion 53 thereof being held at a desired distance above the floor of said channel, thereby assuring a certain height for the layer of glue in the channel, the same being automatically replenished from the open bottle in the same measure as it is used up. The inner segmental portion 54 of the said channel carries the rollers 55 (Figs. 3 and 10) partially submerged in the glue. Bottle 51 may be secured in its place in a removable manner by a spiral spring 56 the ends of which are tied into arms 57 on the glue channel casting 52. Journalled in the frame construction of the machine and in projecting arms thereof is a glue carrier shaft 58 with which may rotate a frame work carrying upwardly and downwardly slidable plungers 59. The rotation of said shaft 58 is provided for from the left hand large gear 42 through gearing 60.

Each plunger 59 is provided with a head 61 (Figs. 7 and 8) the bottom of which may be lined or inlaid with rubber, or felt, and the like, for better application of the glue thereto, while the upper end of each plunger carries a roller 62 whereby to travel on a stationary cam 63 ultimately secured to a part of the frame of the machine. When the plungers pass above the rollers 55 they are permitted to drop down upon the rollers and pick up the glue therefrom. They thereupon are scraped by a resilient member or leaf spring 64 (Figs. 3 and 9) which may be adjusted by the screws 65 to remove the superfluous liquid from the plunger head 61. Said plunger head is then dropped by the cam 63 into a respective metal cap 49 in the wheel 47 and then again lifted therefrom, depositing therein the necessary amount of glue or other cementing liquid.

The glue lined caps are now carried by the wheel 47 between and at the inner sides of two gas burner pipes 67 and 68 to retain them and the glue in them at the most favorable temperature and they so finally arrive in the lower circular recess 69 of a large wheel 70 hereinafter called the assembling element proper secured on the right hand vertical shaft 39. (Fig. 4.)

The sealing disks 71, which, as it is well known, usually are of cork material, are also arranged in a feeding hopper of any of the usual designs (not shown) which may be attached to the top of the vertical disk feed tube 72 and be secured on upstanding frame member 73. The lowermost of the column of the disks 71 is normally resting on top of the large wheel or disk 47, just below the lower end of the feed tube 72 and in the path of a peculiarly shaped push device 74 (Fig. 3) rotating in the direction of arrow 75 and having the three branches 74a, 74b, 74c with the respective recesses 74' and pushing edge 74'' for each, by which it is gently pushed into a respective pocket or recess 76 of a rotating wheel 77 secured on shaft 78. Above the wheel 77 a similar wheel 79 is secured on said shaft, the recesses of which cooperate with certain plungers 80 in and travelling with the right hand large wheel or assembling element proper 70 (to be described presently) whereby shaft 78 and its wheels receive their rotation.

The rotating movement of the triple branched push device 74 is received from the left hand large gear 42 by the intermediacy of gearing 81 and shafts 82 and 83. Guide and cover plates 84 and 85, respectively, are provided in connection with and above said push device 74.

The cork disks 71 are finally carried by the recessed wheel 77 into an upper ring recess 86 in the rim of the right hand large wheel or assembling element proper 70 (Fig. 4) and the movement of the said wheels is so timed that the cap 49 in a lower recess 69 is vertically aligned with a disk 71 in the upper recess 86. Bores 87 and 87' are provided in the rim of the wheel or assembling element proper 70 corresponding to the vertically aligned positions of the pairs of cork disks and caps, and plunger heads 88 may play in said bores, bores 87' being conical and downwardly converging for better centering of the cork disks. Said plunger heads are preferably secured on square stems 89, and a plurality of such plungers are carried around in a frame structure on the rotating wheel or assembling element proper 70, each being slidable upwardly and downwardly and each having an outwardly projecting roller 90 at its upper end whereby to ride on a stationary cam 91 at a certain portion of its travel (Figs. 1, 2) and 14, said cam adjoins the frame 89a on the outside thereof and is secured to the table of the machine, as at 91a.

Normally these plungers are pressed into their lowermost positions by springs 92 thereby keeping each disk 71 firmly pressed into a cap 49 throughout the larger part of one rotation of the wheel or assembling element proper 70. When, however, said plungers arrive to the cam 91, they are first lifted out of the finished closures then again lowered into fresh ones, when their travel in firmly pressed new closure devices again begins.

Figure 13:
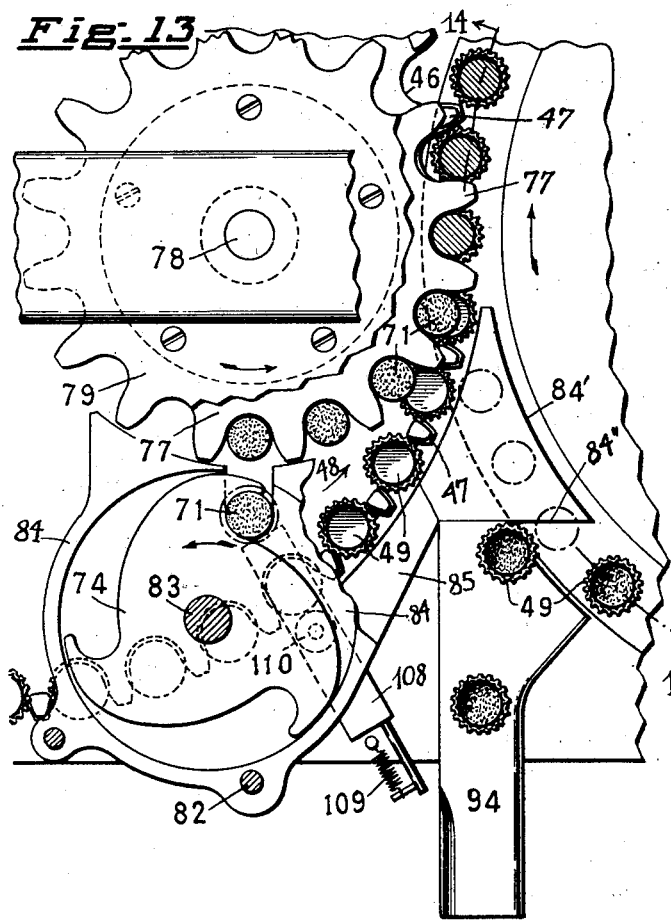
Fig. 13 is an enlarged fragmentary detail showing the device to insert the cork disks into the metal caps and the mechanism to remove the ready caps from the machine.
Figure 14:
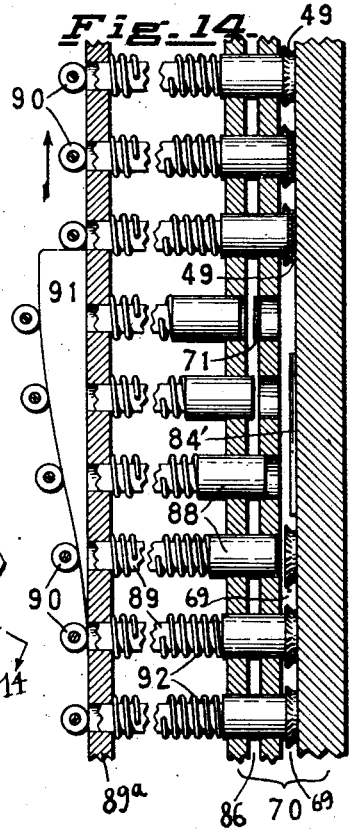
Fig. 14 is a fragmentary sectional view of the pressure plungers and their lifting cam, the section being taken on about the circular line 14—14 in Fig. 13.

The finished closure devices are removed from the circular recesses 69 by an appropriate deflector or knife 84' projecting thereinto at the right location, then dropped into a chute 94 and transferred to a travelling conveyor 95 of any suitable construction, said deflector being made of a piece of sheet metal, shaped as best shown in Fig. 13, secured to the stationary guide piece 85 by any suitable means and projecting into the lower recess 69, so that the caps 49 travelling with wheel or assembling element proper 70 will strike the same after having been released by plungers 88, and ride along the edge 84'' into chute 94.

I also want to remark that I may employ novel means for carrying the metal caps from their feeder or hopper into the pockets 46 of wheel 47, for stopping their flow if desired, and for removing any faulty one from said wheel before it may do any harm therein.

Figure 15:
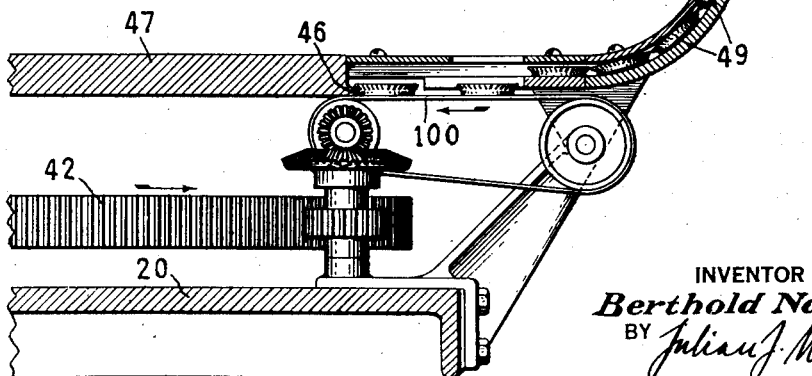

The caps descending through guide channel 45 may be dropped on a small transverse belt conveyor 100 of any suitable construction, driven on its upper branch towards said wheel, its motion being so timed that it will deposit a cap into every pocket 46. The lower end of channel 45 may be cut out to permit the caps to drop on conveyor 100 and the shafts of said conveyor may be journalled in extensions of the frame of the machine and may be driven from a moving part of the machine by any suitable means well known in the art; the structure of this part of the cap feeding mechanism is best shown in Fig. 15, and it is obvious therefrom.

A rod 101 may be provided in connection with the cap feeding device passing through a sleeve 102 secured to an appropriate stationary part of my machine, the end 103 thereof being adapted to enter the channel 45 and so stop the movement of the caps from their hopper into the recesses of the wheel 47. Said rod is normally pressed into such closing position by a spring 104, as shown, but the same also engages a judiciously curved slot 105 in the sleeve 102 through a pin 106 on the rod, and by a turn to the left and upwardly of an arm 107 (Fig. 2) said pin will ride up in said slot, withdrawing the rod 101 and securing it in such a position. When it is desired to again stop the flow of the caps from their hopper, arm 107 is turned downwardly and the end 103 of the rod will enter and close the channel 45 in the cap feeding device.

I also provide means to stop the flow of the cork disks 71 from their hopper in case no caps 49 are fed by their wheel 47. For this purpose an inwardly and outwardly slidable bolt 108 is arranged over the wheel 47 and underneath a part of the cover 84 secured to the stationary part of the machine in the path of the downwardly descending column of such disks 71 normally being urged into said path by a spring 109. A downward roller 110 is, however, arranged on said bolt 108 outside of wheel 47 in such a manner as to be engaged by each cap 49 travelling in wheel 47 and passing said roller. The bolt 108 will then be moved outwardly by said cap; and a disk 71 permitted to drop from its column, while when wheel 47 is empty, bolt 108 will project inwardly and shuts off the column of disks 71.

Finally, means are provided in my machine to eject any cap entering the same and not being of the required size. For this purpose a cap guiding and retaining frame 111 (Figs. 1 and 12) is broken at a place right after the caps are fed into the recesses of the wheel 47, and a yielding pivoted angular piece 112 is inserted therein. In case a cap is larger than the standard, or out of shape, faulty, etc., it will press the piece 112 outwardly, as shown, by the dotted lines in Fig. 12, and will be dropped out of the machine.

In Fig. 11 I illustrate a preferred embodiment of the rubber tip of the glue applying plunger head 61. Said rubber tip is in the form of a short cylinder 113 with a recess 114 in its operating lower end, continued by a narrower bore 115 and it may be secured on the plunger head 61 by a screw 116. The lower operating surface of the cylinder 113 shows a plurality of closely set recesses 117 for better action.

I may also remark that preferably an asbestos or other heat insulating layer 118 (Fig. 3) may be interposed between a recessed body of the wheel 47 and a somewhat smaller top plate 119 thereon, so as to prevent said top plate from becoming overheated and so harm the cork disks 71 sliding thereon while being fed into the recesses of the wheel 77 and into the wheel or assembling element proper 70, underneath the plungers 88.

It will be understood that changes and variations may be made in the parts and combinations of my device and I hereby reserve all my rights to any and all such changes as are within the spirit of the invention and the scope of the appended claims.

What I claim as new, is:

1. In a cap and lining disk bottle closure assembling device, the combination of an assembling element proper having recesses therein to receive the caps and the disks, respectively, in spaced apart aligned pairs, and means to press each disk into its cap and keep it in such position for a predetermined period of time, with carrying means to feed caps and disks into said recesses, said carrying means and said assembling element proper being movable in relation to one another.

2. In a bottle closure assembling device as set forth in claim 1, a feeding device for said cap carrying means including an inclined channel in which the caps may slide, having a cut out portion at the bottom thereof permitting the last cap to drop out therefrom, and a moving conveyor under said cut out portion to move the caps into receiving elements in said cap carrying device.

3. In a bottle closure assembling device as set forth in claim 1, liquid adhesive applying means for the caps including a container for the adhesive, open at the bottom; a channel for the adhesive and in which said container may rest, its open bottom being spaced apart from the floor of said channel, and a plurality of travelling sliding elements adapted to engage the liquid in the channel and to be lowered into and raised from the successive caps in the cap carrying means.

4. In a bottle closure assembling device as set forth in claim 1, means to apply adhesive material into said caps and means to heat both sides of said cap carrying device along the path of the caps therein.

5. In a bottle closure assembling device as set forth in claim 1, said cap carrying device having recesses for said caps; a frame to confine said caps in said recesses when desired, said frame having an open portion therein; a yielding resilient element across the said open portion, but adapted to be forced out of the way and permit an oversized disk to drop out of said cap carrying device.

6. In a bottle closure assembling device as set forth in claim 1, said disk carrying element including a rotatable wheel with pockets therein for said disks; a plate to support said disks, and a movable element to cause said disks to slide on said plate and into the successive pockets on said wheel, a second wheel secured on the same shaft with the said first wheel having peripheral recesses therein; plungers on said assembling element proper for pressing the disks therein into their respective caps, the recesses in said second wheel being adapted to cooperate with said plungers to transmit the motion of said assembling element proper to said second wheel.

7. In a bottle closure assembling device as set forth in claim 1, a disk feeding member adapted to receive a descending column of disks; a resilient element normally forced into the path of said column, and means whereby upon the feeding of each cap into said assembling device proper forces said resilient element will be forced out of the line of said column.

8. In a bottle closure assembling device as set forth in claim 1, said assembling device proper having two peripheral recesses, an upper one for the disks and a lower one for the caps, a partition between said two recesses, a top for said upper recess, said partition and said top having aligned bores and a pressure element passing through each of said bores and pressing into a corresponding cap for the time period desired.

9. In a bottle closure assembling device as set forth in claim 1, said assembling device proper having two peripheral recesses, an upper one for the disks and a lower one for the caps, a partition between said two recesses, a top for said upper recess, said partition and said top having aligned bores and a pressure element passing through each of said bores and pressing into a corresponding cap for the time period desired, said pressure elements being in the form of plungers slidable on a frame and movable with said assembling device proper.

10. In a bottle closure assembling device as set forth in claim 1, said assembling device proper having two peripheral recesses, an upper one for the disks and a lower one for the caps, a partition between said two recesses, a top for said upper recess, said partition and said top having aligned bores and a pressure element passing through each of said bores and pressing into a corresponding cap for the time period desired, said pressure elements being in the form of plungers slidable on a frame and movable with said assembling device proper, and spring means to normally press said plungers through said bores and against the bottom of the recess for the caps.

11. In a bottle closure assembling device as set forth in claim 1, said assembling device proper having two peripheral recesses, an upper one for the disks and a lower one for the caps, a partition between said two recesses, a top for said upper recess, said partition and said top having aligned bores and a pressure element passing through each of said bores and pressing into a corresponding cap for the time period desired, said pressure elements being in the form of plungers slidable in a frame and movable with said assembling device proper, spring means to normally press said plungers through said bores and against the bottom of the recess for the caps, and a stationary cam to raise said plungers for desired portions of the travel of the assembling device proper.

12. In a bottle closure assembling device as set forth in claim 1, said assembling device proper having two peripheral recesses, an upper one for the disks and a lower one for the caps, a partition between said two recesses, a top for said upper recess, said partition and said top having aligned bores, and a pressure element passing through each of said bores and pressing into a corresponding cap for the time period desired, said pressure elements being in the form of plungers slidable in a frame and movable with said assembling device proper, spring means to normally press said plungers through said bores and against the bottom of the recess for the caps, a stationary cam to raise said plungers for desired portions of the travel of the assembling device proper, and transverse rollers on the plungers to ride them on said cam thereby, a portion of said plungers slidable in said frame being angular in cross-section to prevent their turning.

13. In a bottle closure assembling device as set forth in claim 1, a feeding device for the caps, having an inclined channel in which said caps may slide and stopping means for said caps comprising a rod, spring means to normally press said rod in the path of said caps, and means to withdraw said rod from said path when desired.

14. In a bottle closure assembling device as set forth in claim 1, said assembling device proper being in the form of a wheel having two radial channels in its periphery, the upper one being for the disks and the lower one for the caps, a partition between said two recesses, a top for said upper recess, said partition and said top having aligned bores, a pressure element passing through each bore and pressing each disk into a corresponding cap for the period desired, said cap and disk carrying elements being in the form of wheels having circumferential pockets to receive the caps and disks, respectively, and reaching into the respective channels in the assembling wheel, and means to rotate said three wheels in synchronism.

15. In a device of the class described, a cap carrying member, a disk feeding device adapted to receive a column of disks resting on said cap carrying member, a disk carrying member with recesses therein to receive individual disks, and means operating on said cap carrying member adapted to move the disks into said recesses.

16. In a device as set forth in claim 15, means to apply adhesive into said caps; heating means for the caps with the adhesive therein, and heat insulating means in said cap carrying device to prevent the overheating of the disk supporting part thereof.

17. In a bottle closure assembling device as set forth in claim 1, said disk carrying element including a rotatable wheel with pockets therein for said disks; a plate to support said disks and a movable element to cause said disks to slide on said plate and into the successive pockets on said wheel.

18. In a bottle closure assembling device as set forth in claim 1, said disk carrying element including a rotatable wheel with pockets therein for said disks; a plate to support said disks and a movable element to cause said disks to slide on said plate and into the successive pockets on said wheel, said movable element being in the form of a rotating multiple branched plate on said supporting plate having a recess in each of its branches to receive a disk and a pushing edge on each of its branches to move said disk while rotating.

19. In a bottle closure assembling device as set forth in claim 1, a disk feeding member forming a descending column of disks; a resilient element normally forced into the path of said column and means whereby each cap fed to said assembling device proper forces said resilient element out of the line of said column and permits a disk to pass said cap carrying device causing said caps to travel; a roller on said resilient element in the path of said caps and being engaged by the successive caps so as to move said resilient element.

20. In a bottle closure assembling device as set forth in claim 1, said assembling device proper having two peripheral recesses, an upper one for the disks and the lower one for the caps, a partition between said two recesses, a top for said upper recess, said partition and said top having aligned bores and a pressure element passing through each of said bores and pressing in to a corresponding cap for the time period desired, said pressure elements being in the form of plungers slidable in a frame and movable with said assembling device proper; spring means to normally press said plungers through said bores and against the bottom of the recess for the caps; a stationary cam to raise said plungers for desired portions of the travel of the assembling device proper, and a scraper member to remove the assembled closures from the lower recess when said plungers are raised therefrom.

21. In a bottle closure assembling device as set forth in claim 1, a feeding device for the caps, including an inclined channel in which said caps may slide, and stopping means for said caps, comprising a rod, spring means to normally press said rod into the path of said caps, and means to withdraw said rod from said path when desired, said means to withdraw said rod including a sleeve in which said rod may slide having a curved guide slot cut therein, and a pin on said rod reaching into said slot.

22. In a bottle closure assembling device as set forth in claim 1, said assembling device proper being in the form of a wheel having two radial channels in its periphery, the upper one being for the disks and the lower one for the caps, a partition between said two channels; a top for the upper channel, said partition and said top having aligned bores; a pressure element passing through each bore and pressing each disk into a corresponding cap for the period desired, said cap and disk carrying elements being in the form of wheels having circumferential pockets to receive the caps and disks, respectively, and reaching into the respective channels in the assembling wheel, and means to rotate said three wheels in synchronism; a feeding device for said disks including a descending column of disks resting on the top of said cap carrying wheel as a support, and a moving device pushing successive disks into successive pockets in said disk wheel.

23. In a bottle closure assembling device as set forth in claim 1, said assembling device proper being in the form of a wheel having two radial channels in its periphery, the upper one being for the disks and the lower one for the caps; a partition between said two channels; a top for the upper channel, said partition and said top having aligned bores; a pressure element passing through each bore and pressing each disk into a corresponding cap for the period desired, said cap and disk carrying elements being in the form of wheels having circumferential pockets to receive the caps and disks, respectively, and reaching into the respective channels in the assembling wheel; means to rotate said three wheels in synchronism, and confining and guiding plates for the disks on the top of said cap wheel and in the pockets of said disk wheel.

24. In a bottle closure assembling device as set forth in claim 1, said assembling device proper having two peripheral recesses, an upper one for the disks and a lower one for the caps; a partition between said two recesses; a top for said upper recess, said partition and said top having aligned bores; a pressure element passing through each of said bores and pressing into a corresponding cap for the time period desired, the bores in said partition being downwardly narrowing conical shaped.

BERTHOLD NAGY.